Figures 1, 2, 3:
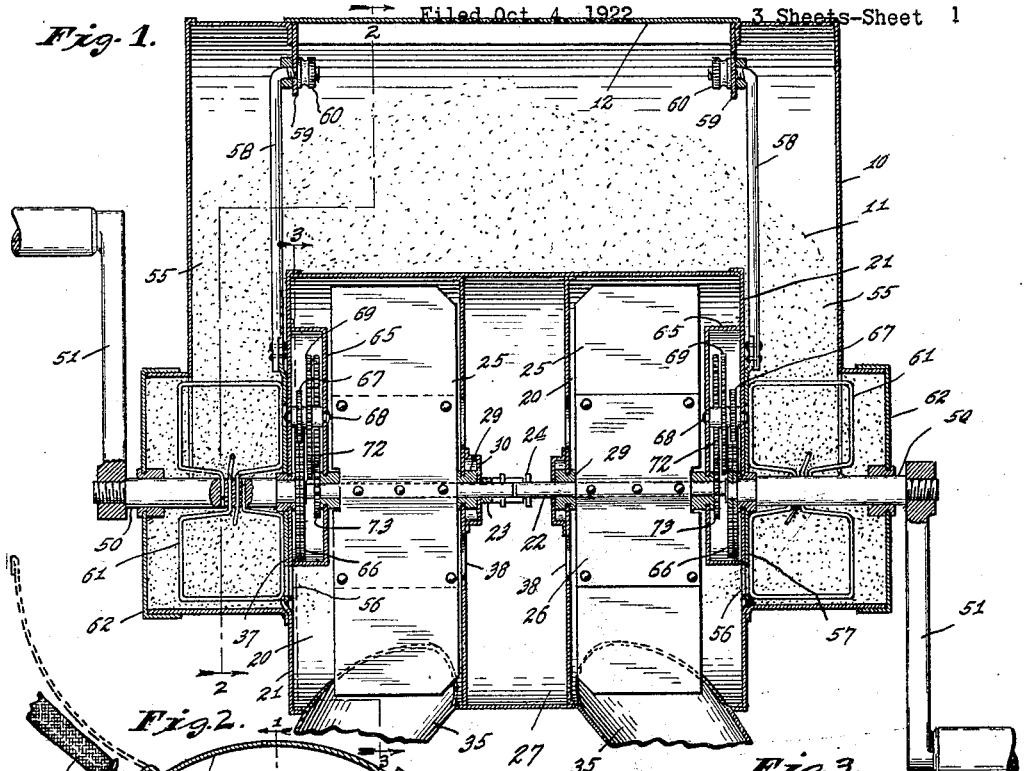

Oct. 2, 1928.

E. J. FEENY

MULE BACK DUSTER

Filed Oct. 4, 1922

1,686,317

3 Sheets-Sheet 1

INVENTOR.
Edmund J. Feeny,
BY
ATTORNEY.

Oct. 2, 1928.

E. J. FEENY

MULE BACK DUSTER

Filed Oct. 4, 1922

1,686,317

3 Sheets-Sheet 2

INVENTOR.
Edmund J. Feeny,
BY
ATTORNEY.

Oct. 2, 1928.
E. J. FEENY
1,686,317
MULE BACK DUSTER
Filed Oct. 4, 1922
3 Sheets-Sheet 3
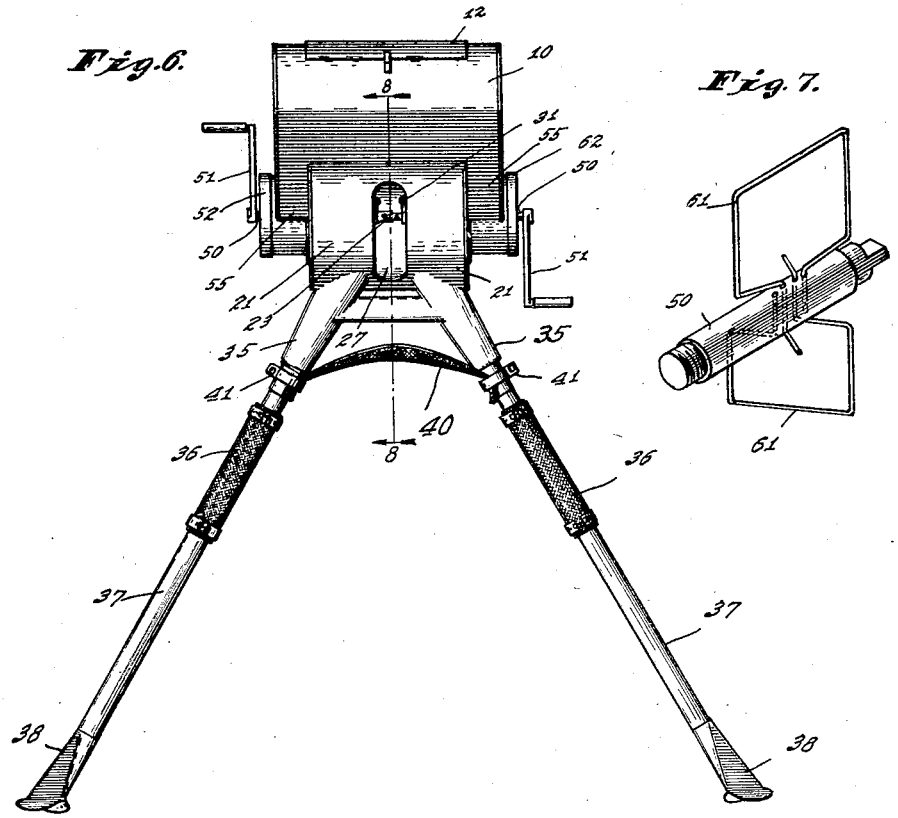
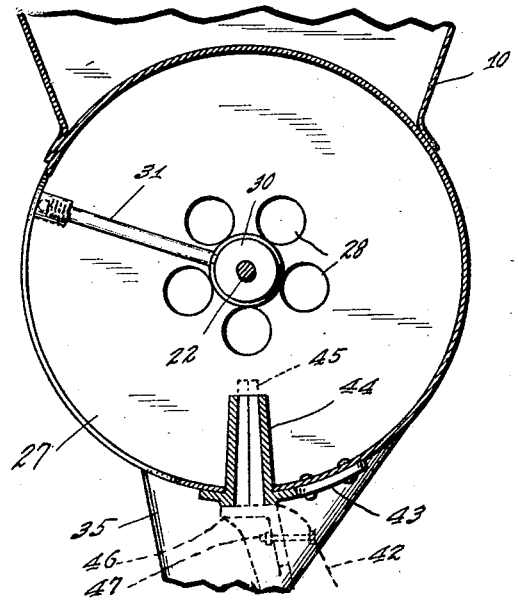
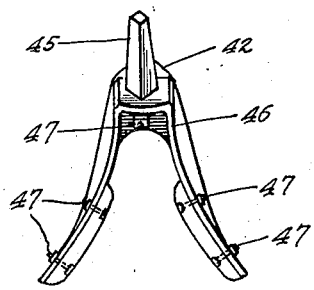
INVENTOR.
Edmund J. Feeny,
BY
G. Behler
ATTORNEY.

Patented Oct. 2, 1928.

1,686,317

UNITED STATES PATENT OFFICE.

EDMUND J. FEENY, OF MUNCIE, INDIANA.

MULE BACK DUSTER.

Application filed October 4, 1922. Serial No. 592,274.

In fighting the increasingly menacing boll weevil in the cotton fields, it has been found that calcium arsenate is perhaps the most effective agent; but great difficulty has been experienced in applying this in an effective manner suitable for cotton field conditions. In order to make the calcium arsenate effective, it has been found necessary to dust it over the cotton plants so that they will be enveloped in a cloud of this dust; and to do this in such a manner that the dust will be taken up by the dew on the cotton plants, which dew the boll weevil drinks. Therefore, it is ordinarily necessary to dust the cotton fields at night, when the dew is on them.

Attempts have been made to do this by hand blowers; but the labor required is so great that it is not a practical method for large areas. Attempts have also been made to dust the fields by power driven blowers on vehicles; but this is found to be unsuitable for universal cotton field dusting, because of the weight of the vehicles, which often can not be drawn through the mud and water, frequently hub deep, in the cotton-fields, and were not readily adapted for use between the rows of cotton.

It is the object of my present invention to provide a dusting device which is suitable for cotton-field dusting on a large scale, and which uses fundamentally those units of transportation and labor which are most available for and adapted to cotton-field work—in other words, to provide a duster which is carried on the back of a mule and operated by a man riding the mule; for a mule and a negro form this natural unit of transportation and labor most suitable for cotton field cultivation.

In carrying out my invention, therefore, I provide, fundamentally, a mule-back duster. This in general comprises a container arranged to be carried on the back of the mule, preferably by resting on his withers or on the pommel of the saddle, and one or more blowers associated with this container and operated by the rider for discharging the calcium arsenate through downwardly directed tubes at the sides of the mule for dusting the rows of cotton between which the mule walks. The duster is preferably strapped to the rider to facilitate his operation of the blowers.

While my invention is primarily and expressly designed for dusting cotton fields with calcium arsenate, it is by no means limited to that particular use, but can of course be used wherever it is suitable.

Figure 4:
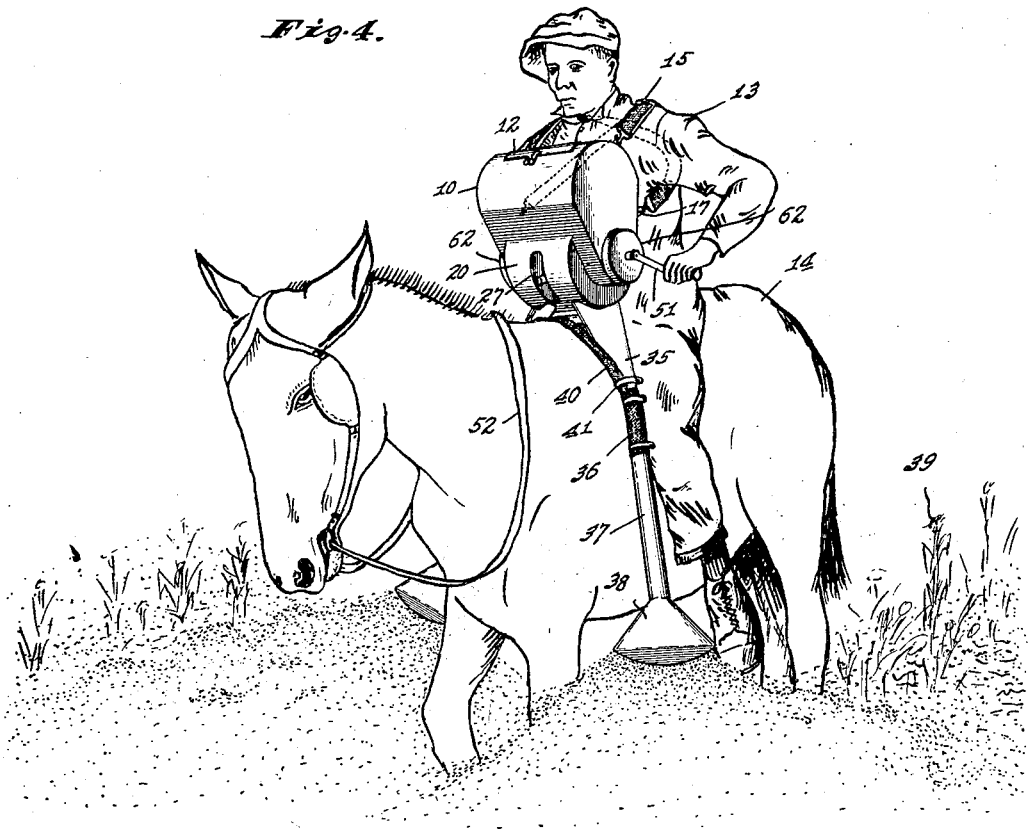
Figure 5:
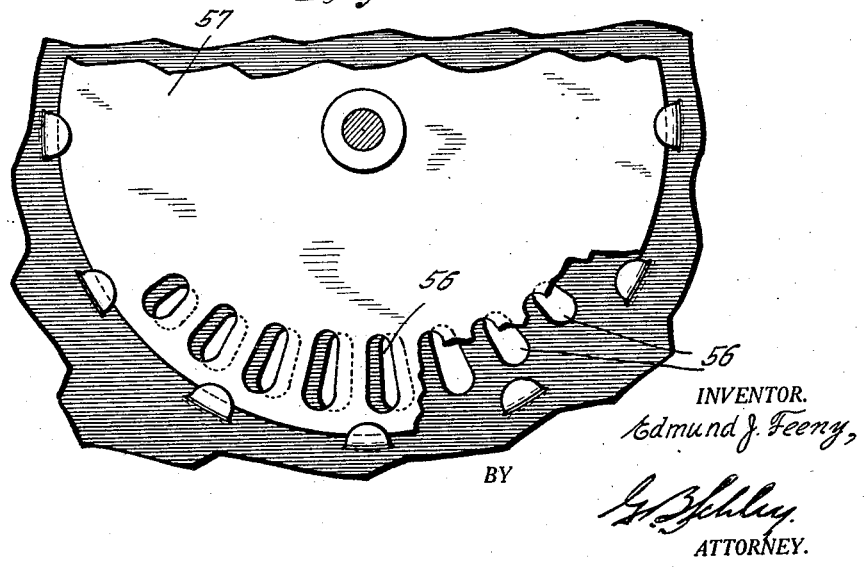

The accompanying drawings illustrate my invention: Fig. 1 is a vertical transverse section through a duster embodying my invention, with the discharge tubes broken away, the section being taken on the line 1—1 of Fig. 2, looking toward the rear; Fig. 2 is a vertical section on the line 2—2 of Fig. 1; Fig. 3 is a vertical section on the line 3—3 of Fig. 1; Fig. 4 is a perspective view of my mule-back duster in use, with the associated mule and rider; Fig. 5 is an enlarged view of the controlling shutter which controls the inlet of the powdered calcium arsenate to the blower, and which is shown in the lower part of Fig. 2; Fig. 6 is a front elevation of the complete duster; Fig. 7 is a detail of the stirrer on the blower shaft for preventing cohesion of the powdered calcium arsenate into a mass; Fig. 8 is a fragmentary section on the line 8—8 of Fig. 6, showing a modified mounting used when the duster is carried on the pommel of a saddle; and Fig. 9 is a front view of the carrying pin used in the modification shown in Fig. 8, in its position on the saddle.

The duster has a main casing 10, which serves as a container for the calcium arsenate 11 and is provided at the top with a hinged door 12. This casing is preferably arranged to be attached to the rider 13 of the mule 14 by straps 15 which go over the rider's shoulders like suspenders and are crossed at his back, and at their ends have hooks 16 attachable to suitable fittings 17 on the casing 10.

Two centrifugal blowers 20 are provided in the lower part of the casing 10, each blower having its own separate casing 21 which in part forms the bottom of the powder-containing chamber and in part projects beyond the outlines of the main casing 10, as is clear from Figs. 2, 3, and 4. The two blowers 20 are preferably on a common transverse axis, so that they have alined operating shafts 22; which may project into proximity to each other through the adjacent walls of the two blower casings 21. These two shafts 22 are preferably normally independent of each other in their operation, so that either may be operated without the other; but the two shafts may be connected if desired, preferably by a separable coupling provided between their adjacent ends by a slotted sleeve 23 carried by one of said shafts and rotatable therewith but slidable therealong so that the slot in the sleeve embraces a cross pin 24 in the other of said shafts to interconnect the two shafts. Each of the blowers 20 has a fan blade 25 fixed on its operating shaft, which fan blade as shown consists of a strip of sheet metal which extends substantially diametrically across the blower casing 21 on one side of the operating shaft and has attached thereto the ends of a shorter strip 26 which extends on the opposite side of said operating shaft, as is clear from Fig. 3, so that the shaft will be between the two strips of sheet metal, both of which are fastened to the shaft by common attaching rivets. The two blower casings 21 are separated from each other, to provide an air-supply space 27 open toward the front, as is clear from Fig. 4; and in the adjacent end walls of the blower casings there are air-inlet openings 28 near the shafts 22, through which openings air is drawn in by the rotation of the fan blades. The air-inlet openings 28 surround a bearing 29 for one end of the operating shaft 22 of that blower, which bearing 29 is within a small bearing-casing 30 to which oil may be supplied by an oil tube 31 lying substantially radially along the end wall of the blower casing 21, as is clear from Figs. 4 and 8.

Each blower casing 21 is provided with a downwardly directed outlet tube 35, through which air is forced by the operation of the associated fan 25. The two outlet tubes 35 project downward on opposite sides of the mule 14, as is clear from Fig. 4, and are connected by flexible tubes 36 with downward extensions 37 having discharge heads 38 at their lower ends, from which discharge heads 38 the calcium arsenate is discharged in a sheet which as the mule walks forward forms a cloud completely enveloping the cotton plants 39 of the rows between which the mule is walking. The flexible tubes 36 permit the extensions 37 and discharge heads 38 to swing out of the way of any solid obstructions which they may encounter.

Between the two outlet pipes 35 of the two blowers the duster is supported on the back of the mule. Ordinarily, this support is obtained by a cross strap 40 which at its middle rests upon the withers of the mule and at its ends is attached by clamps 41 to the lower ends of the two outlet pipes 35, as is clear from Fig. 4. This provides a very satisfactory mounting, since it not only carries the weight of the duster but at the same time allows the duster to swing on the back of the mule to accommodate the movements of the rider 13. In some instances, however, it may be preferred to mount the duster on the pommel of the rider's saddle 42, in which case the construction shown in Figs. 8 and 9 may be used. In that modified mounting, the lower wall of the air-supply space 27 may have a casting 43 riveted thereto, which casting has a downwardly opening socket 44 which receives an upwardly projecting pin 45 forming part of a casting 46 which is attached by bolts 47 to the pommel of the saddle 42. The pin 45 and socket 44 are preferably polygonal in cross-section, as Fig. 9 shows the pin, to prevent the duster from turning on the saddle. When the duster mounting shown in Figs. 8 and 9 is used, the rider may use the bracing straps 15 or not as he desires, as the duster is rigidly held on the mule without being strapped to the rider.

The blower shafts 22 are driven from driving shafts 50, of which there is one for each blower. These driving shafts 50 are preferably alined with the blower shafts 22. These driving shafts 50 project out from the two sides of the duster, as is clear from Figs. 1, 4, and 6, and are there provided with operating crank-handles 51 in convenient position to be turned by the two hands of the rider 13. He can use both hands for operating the blower, with each hand separately driving its own blower, so that the blowers can be controlled separately. This use of both hands is readily possible when using the ordinary field mule, as the mule will walk the path between rows without ordinarily requiring the rider 13 to guide him by the bridle 52; and at the end of the row the rider can easily reach the bride for turning the mule to start him back between two other rows.

The shafts 50 project through the lower parts of downward feed-chutes 55, provided in the two lateral ends of the casing 20 between the lateral end walls of said casing and the outer end walls of the blower casings, 21. The calcium arsenate is fed down through these feed-chutes 55 and surrounds the shafts 50; and from the lower ends of these feed-chutes 55 the calcium arsenate is discharged into the blower casings 21 through openings 56 in the end walls of said blower casings. These openings 56 are preferably arranged at intermediate points on radii of the blower casing, too far outward to be subject to suction and too far inward to be subject to pressure by the air movement created by the fan blades 25. In consequence, the calcium arsenate will pass through the holes 56 substantially free from any interference from pressure or suction; but when once within the blower casings will be caught by the rotating blades 25 and thrown out with the air stream through the outlet pipes 35.

In order to control the quantity of calcium arsenate used, I vary the effective size of the openings 56, by a valve plate 57 rotatably adjustable about each shaft 50 by an upwardly extending rod 58, which at its upper end projects horizontally through an arc-shaped slot in a clamping plate 59 within the casing 10; and on such laterally projecting end I provide a knurled clamping nut 60 by which the rod 58 may be clamped in any desired position. The lower part of the valve plate 57 is provided with openings corresponding with the openings 56, and movable more or less into registry therewith by the adjustment of the valve plate 57 about its axis when the nut 60 is loosened and the rod 58 is moved.

In order to prevent sticking together of the calcium arsenate powder, I preferably provide the shafts 50 with stirrers which sweep over the openings 56. Each of these stirrers consists of a pair of wire loops 61, the ends of each of which are slightly separated and project into holes extending transversely through the associated driving shafts 50 and longitudinally displaced from each other along such shaft. One end of each loop extends completely through the associated shaft 50, and the projecting part is bent to hold the loop in place as the shaft is rotated. The loop has one part which sweeps over the holes 56 in close proximity thereto, and forces powder through such holes as it sweeps; and the other parts of the stirrer keep the powder from sticking together into one coherent mass. The stirrer loops are not rigidly mounted in their carrying shafts 50, however, so that if they encounter anything solid, they may yield resiliently, as shown in Fig. 7, by turning about an intermediate axis transverse to the shaft 50 and between the two loop-ends, producing a slight twisting of the wire of the loop as the two loop ends which project through the shaft are displaced from the plane of the loop as the latter is turned, so that by the resiliency of the wire the loop will be swung back into its normal plane as soon as it has passed by the resisting object which it encountered. Preferably a removable cap 62 is provided at the lower end of the feed-chute 55 and carries a bearing for the outer end of the associated driving shaft 50. By the removal of this cap 62, after first removing the crank-handle 51, access is obtained to the lower end of the feed-chute, for inspection, cleaning, and repair.

Each driving shaft 50 is suitably connected to the associated blower shaft 22 by a speed-increasing gearing, so that the fan 25 will be rotated at a speed greatly in excess of that of the driving shaft 50, in order to get the desired flow of air. This speed-increasing gearing is preferably mounted in a gearing-housing 65, preferably cylindrical, and preferably of the same size as the removable cap 62 so that both can be made as from the same stampings. The gearing-housing 65, however, has its axis displaced upward from the axis of the shafts 22 and 50 and cap 62, so that its lower part will be above the holes 56 which admit the calcium arsenate into the blower casing, as is clear from Fig. 1. The speed-increasing gearing consists of a main driving gear 66 on that end of the shaft 50 which is within the gearing-housing 65; which driving gear 66 meshes with a pinion 67 on a stud shaft 68 supported in the gearing-housing 65; rotatable with which pinion 67 on the shaft 68 is a gear 69 which meshes with pinion 70 on another stud shaft 71 mounted within the gearing-housing 65; and a gear 72 is rotatable with the pinion 70 on the stud shaft 71 and meshes with a pinion 73 on the blower shaft 22. The three gears 66, 69, and 72 may all be similar, and the three pinions 67, 70, and 73 may also all be similar. The gear 66, however, is preferably of twice the thickness of the gears 69 and 72, for greater strength, and may be formed by putting two thinner gears together; and these two gears are riveted on the end of the shaft 50, as is clear from Fig. 1, so that the riveted end of said shaft 50 may serve as an abutment for the adjacent end of the blower shaft 22. This makes a speed-increasing gearing having a ratio which is the cube of the ratio of the number of teeth of one of the gears to that of one of the pinions, and makes it possible for the operator to get a very effective fan-speed by a relatively slow turning movement of the handles 51. The adjacent ends of the shafts 50 and 22 are mounted in suitable bearings in the end walls of the gearing-housing 65, which gearing-housing is preferably packed with lubricant for lubricating both the bearings and the gears. Additional lubricant may be supplied to the gearing-housing 65 when necessary, by first removing a closing cap 74 in the wall between the gearing-housing and the feed-chute; access being obtained to this cap 74 by first removing the cap 62.

In operation, the duster is mounted in front of the rider 13 and like him is astride of the mule 14. The calcium arsenate being placed within the main casing 10, the mule is started down between two rows of cotton, and the rider turns the two cranks 51. The calcium arsenate is fed down through the feed chutes 55 and forced through the holes 56 by the stirrers 61. This powder thus forced into the blower casings through such holes is picked up by the rapidly rotating fans 25 and thrown outward with the stream of air (drawn in through the holes 26) through the outlet pipes 35, flexible tubes 36, extensions 37, and heads 38. These heads 38 discharge the calcium arsenate in a sheet, which becomes a cloud by the forward movement of the mule between the rows; and this cloud envelops the cotton plants and is taken up by the dew thereon. This is found to provide an effective and easily applied treatment of the cotton plants for the boll weevil; which drinks the dew thus saturated with the calcium arsenate, and dies.

If for any reason anything goes wrong with the apparatus, even an unskilled laborer can get access to all the necessary parts, and can readily cure the difficulty. He cannot get access to the interior of the blower or the gearing, which are expressly designed to that end; but by opening the lid 12 and removing the caps 62, access may be had to the calcium arsenate and to the entire path thereof up to the point of entrance into the blower casing. The whole device may be operated and maintained by negro labor; and it may be operated under the most adverse conditions of swamp and mud encountered in cotton-fields, as the mule is substantially the only unit of transportation which can travel under the conditions frequently encountered.

I claim as my invention:

1. A mule-back duster, comprising a container arranged for mounting on the back of a mule and provided with projecting discharge tubes at the sides of the mule, two blowers for receiving powder from said container and discharging it through said two discharge tubes respectively, two operating handles arranged for operation by the two hands of the rider of the mule and connected to said two blowers respectively, said two blowers having alined shafts, and a separable coupling between said two shafts.

2. A device of the character described comprising a housing, a partition dividing said housing into a blower compartment and an insecticide compartment, a fan mounted in the blower compartment, a shaft extending longitudinally of said housing, a gearing adapted to be driven by said shaft for the purpose of driving the fan in the blower compartment, and a gear housing for supporting said gearing, said gear housing being carried by the partition of the first-mentioned housing.

In witness whereof, I have hereunto set my hand, at Indianapolis, Indiana, this second day of October, A. D. one thousand nine hundred and twenty-two.

EDMUND J. FEENY.